Figure 1:
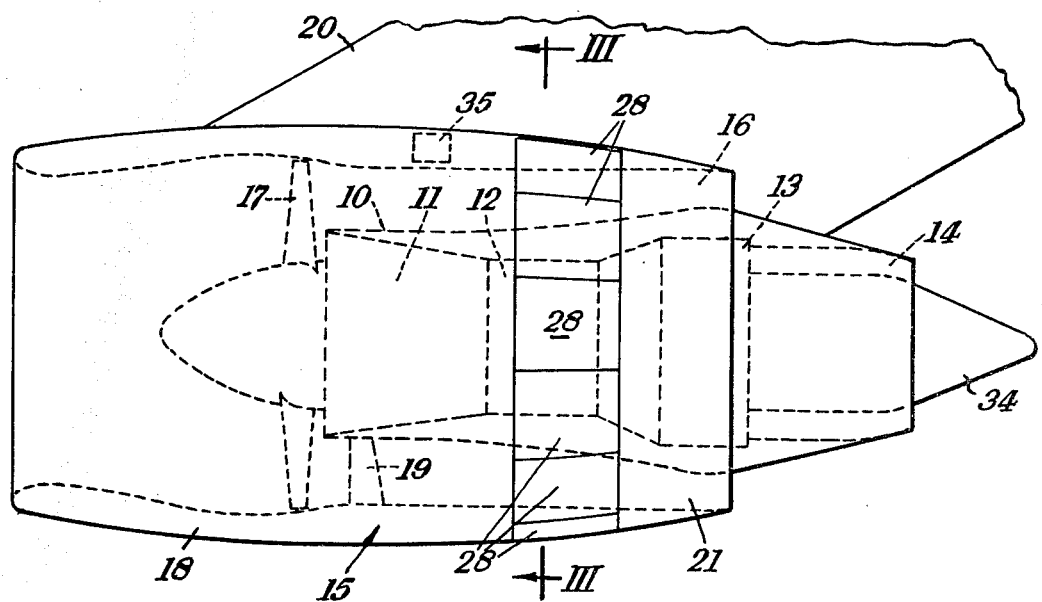

United States Patent [19]

Montgomery

[11] 4,137,711
[45] Feb. 6, 1979

[54] GAS TURBINE ENGINES

[75] Inventor: Ronald Montgomery, Belfast, Ireland

[73] Assignee: Short Brothers & Harland Limited, Belfast, Ireland

[21] Appl. No.: 800,073

[22] Filed: May 24, 1977

[30] Foreign Application Priority Data

Jun. 8, 1976 [GB] United Kingdom ............... 23722/76

[51] Int. Cl.² .......................... F02K 1/20; F02K 3/06
[52] U.S. Cl. ................................... 60/226 A; 60/230;
239/265.31
[58] Field of Search ...................... 60/226 A, 228, 230,
60/232; 239/265.31

[56] References Cited

U.S. PATENT DOCUMENTS

| 3,475,913 | 11/1969 | Mortlock | 60/226 A |
| 3,736,750 | 6/1973 | Britt | 60/226 A |
| 3,815,357 | 6/1974 | Brennan | 60/226 A |
| 3,841,091 | 10/1974 | Sargisson | 60/226 A |

Primary Examiner—Robert E. Garrett
Attorney, Agent, or Firm—Cushman, Darby & Cushman

[57] ABSTRACT

A gas turbine engine comprises a duct for the passage of a thrust producing gas, the duct having an upstream portion and a downstream portion spaced apart in a direction parallel to the axis of the duct, the downstream portion being movable relatively to the upstream portion between a closer spaced position and a further spaced position. A plurality of thrust reversal doors are pivotally connected to an upstream end of the downstream portion and extend therefrom towards the upstream portion, and a linkage assembly has a one end fixed relatively to the upstream portion and acts on each thrust reversal door. The linkage assembly during movement of the downstream portion to the closer spaced position causes the thrust reversal doors to pivot to open the space between the upstream and downstream portions and to close the duct for the reversal of thrust and during movement of the downstream portion to the further spaced position, causes return pivoting of the thrust reversal doors to close or substantially close the space between the upstream and downstream portions and to leave the duct unobstructed by the doors.

16 Claims, 7 Drawing Figures

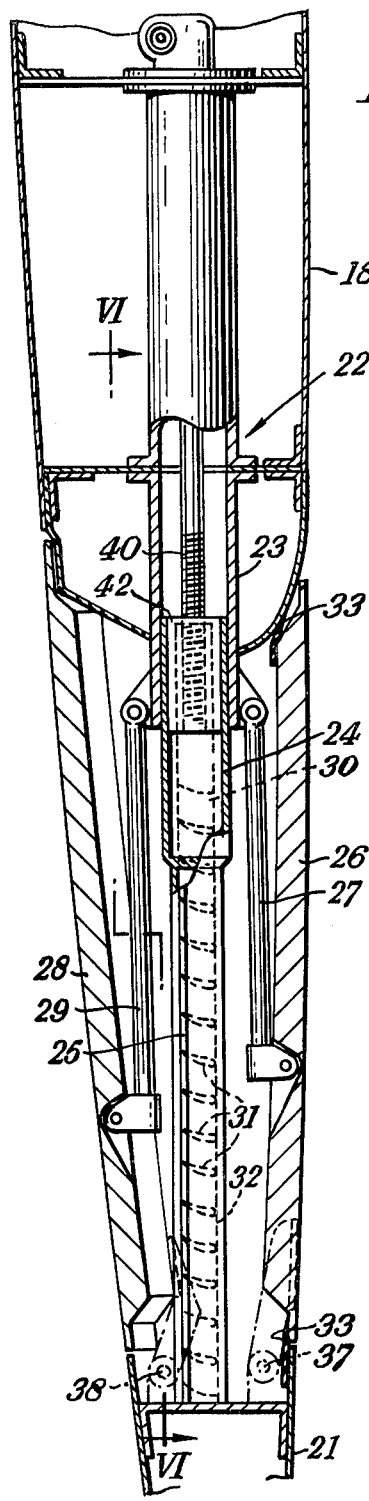
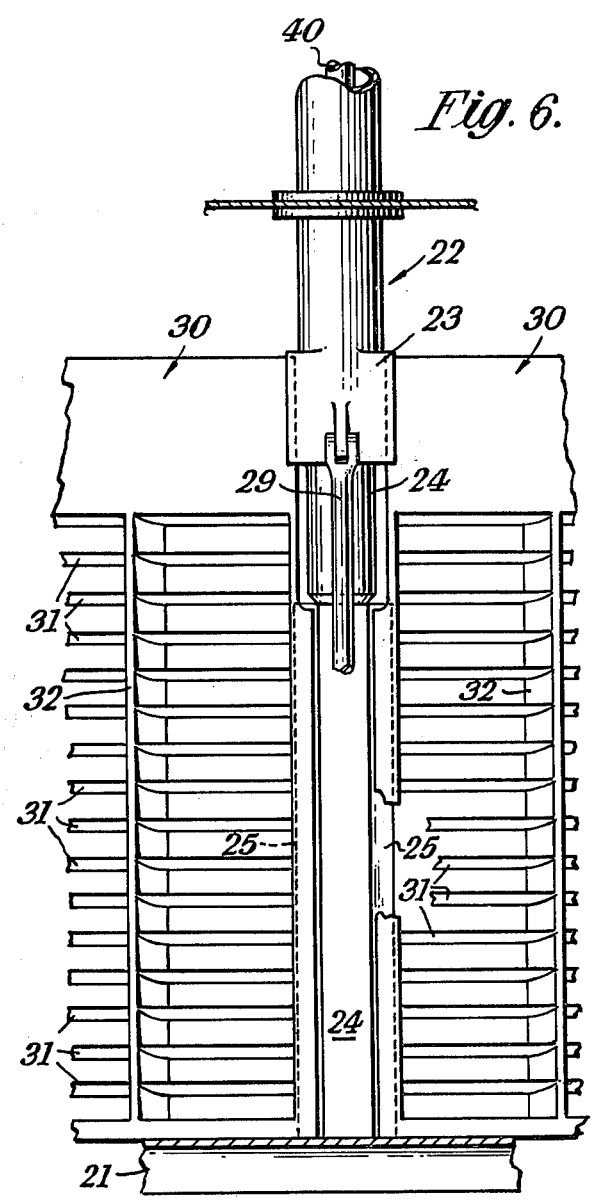

GAS TURBINE ENGINES

The invention relates to gas turbine engines and more particularly to the reversal of thrust in a gas turbine engine.

According to the invention there is provided a gas turbine engine comprising a duct for the passage of a thrust producing gas, the duct having an upstream portion and a downstream portion spaced apart in a direction parallel to the axis of the duct, the downstream portion being movable relatively to the upstream portion in the said direction between a closer spaced position and a further spaced position, a plurality of thrust reversal doors pivotally connected to an upstream end of the downstream portion and extending therefrom towards the upstream portion, and a linkage assembly having a one end fixed relatively to the upstream portion and acting on each thrust reversal door at a point on the door spaced axially from the pivotal connection of the door to the downstream portion, the linkage assembly during movement of the downstream portion to the closer spaced position causing the thrust reversal doors to pivot to open the space between the upstream and downstream portions and to close or substantially close the duct for the reversal of thrust when the downstream portion reaches said closer spaced position and during movement of the downstream portion to the further spaced position causing return pivoting of the thrust reversal doors to close or substantially close the space between the upstream and downstream portions and to leave the duct unobstructed or substantially unobstructed by the doors when the downstream portion reaches said further spaced position.

Figure 2:
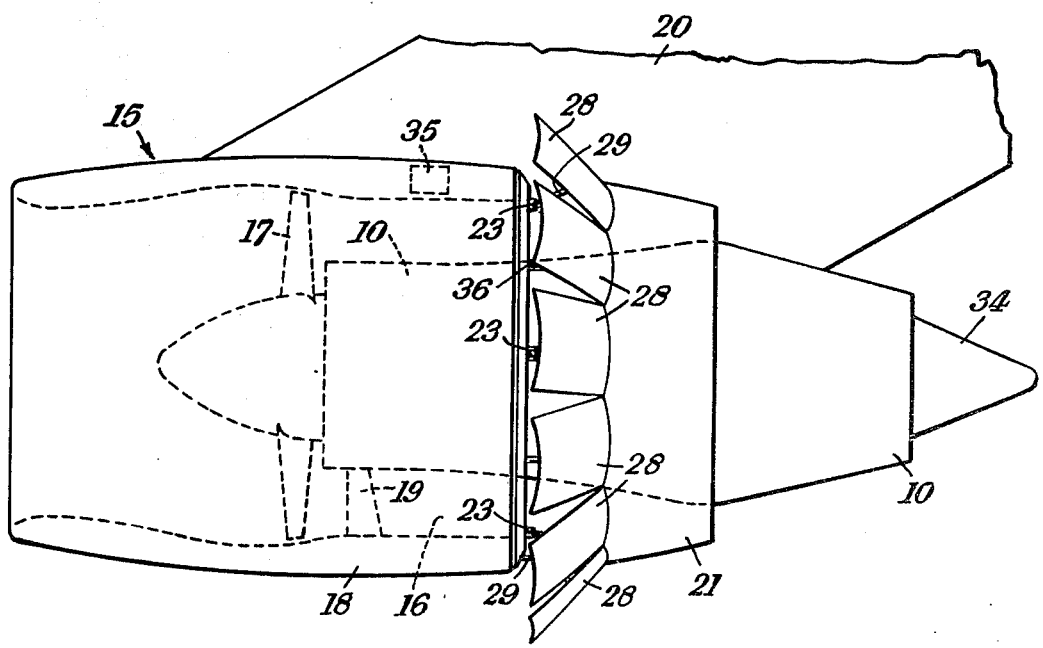
Figure 3:
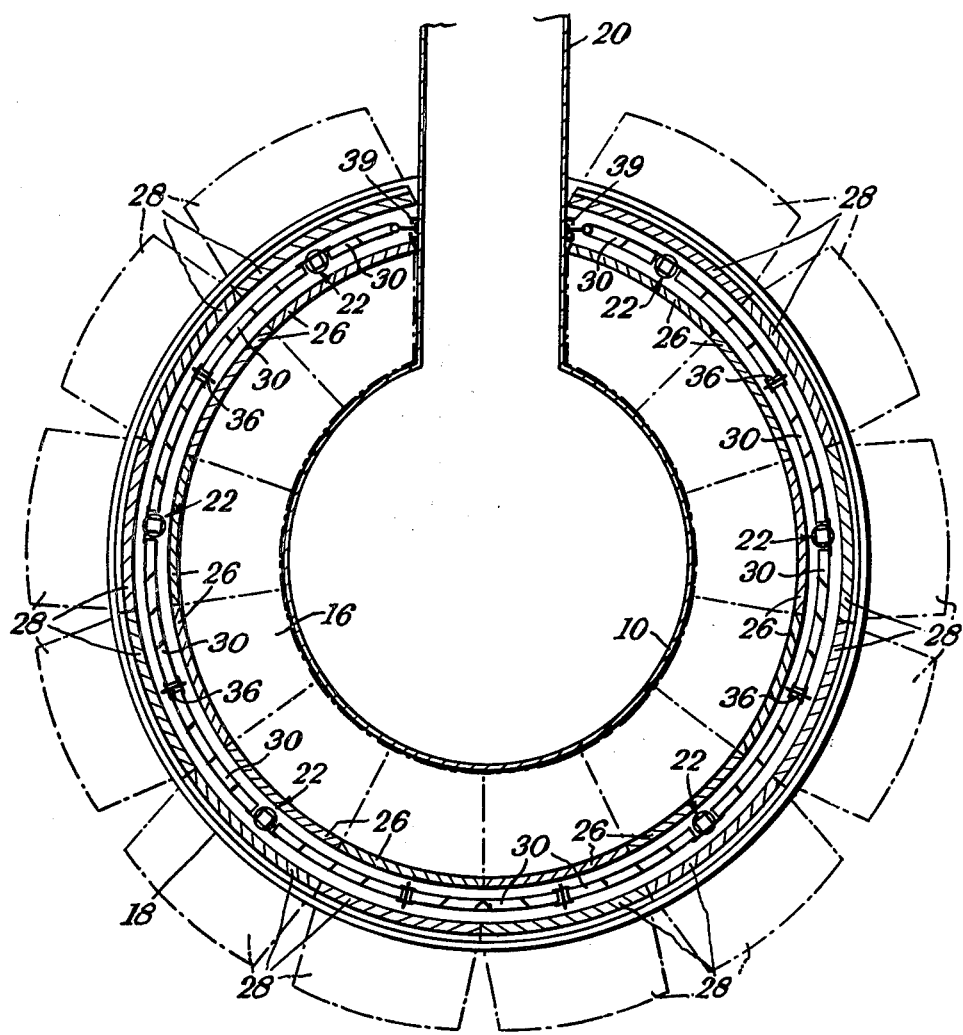
Figure 4:
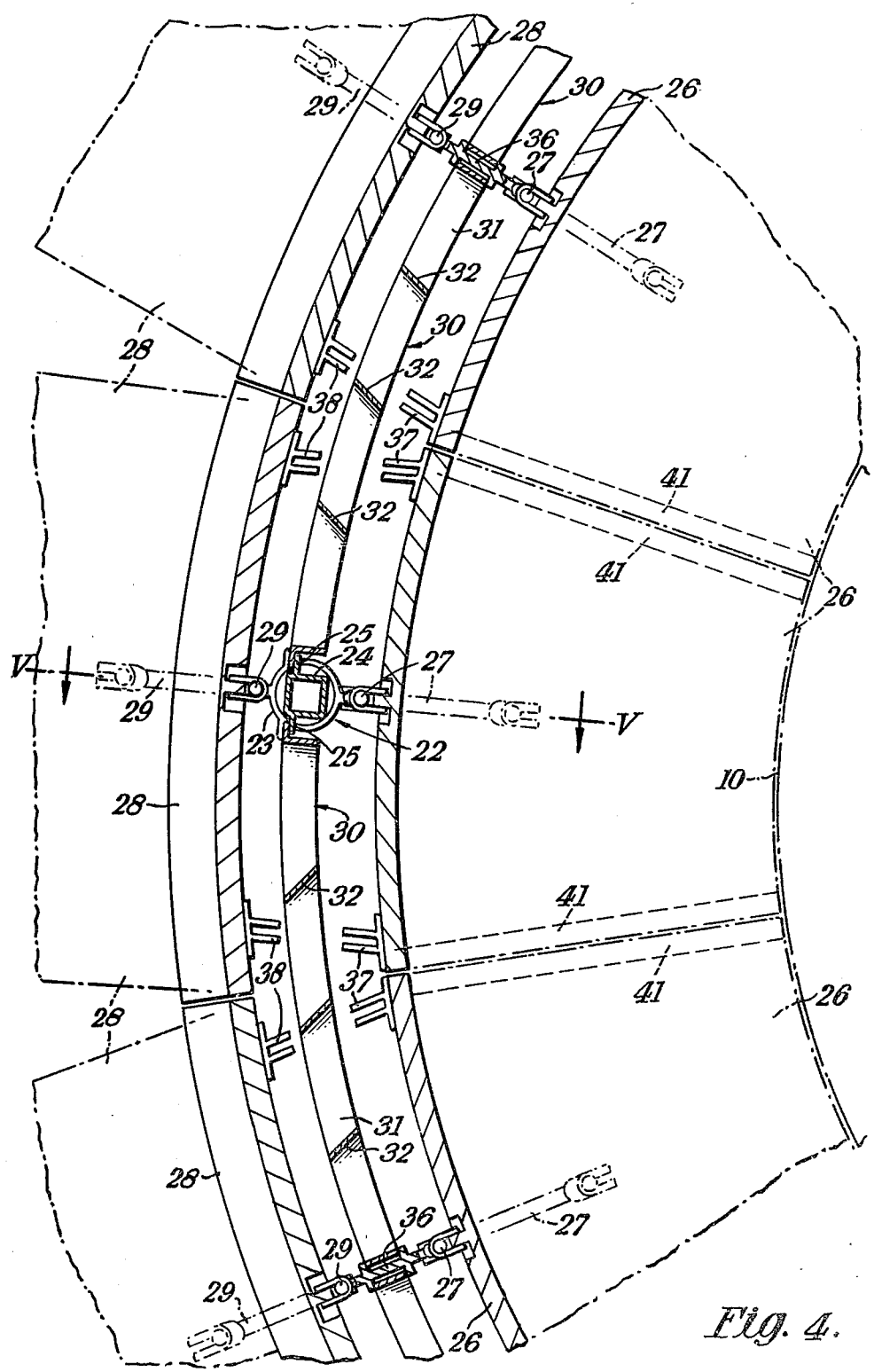
Figure 7:
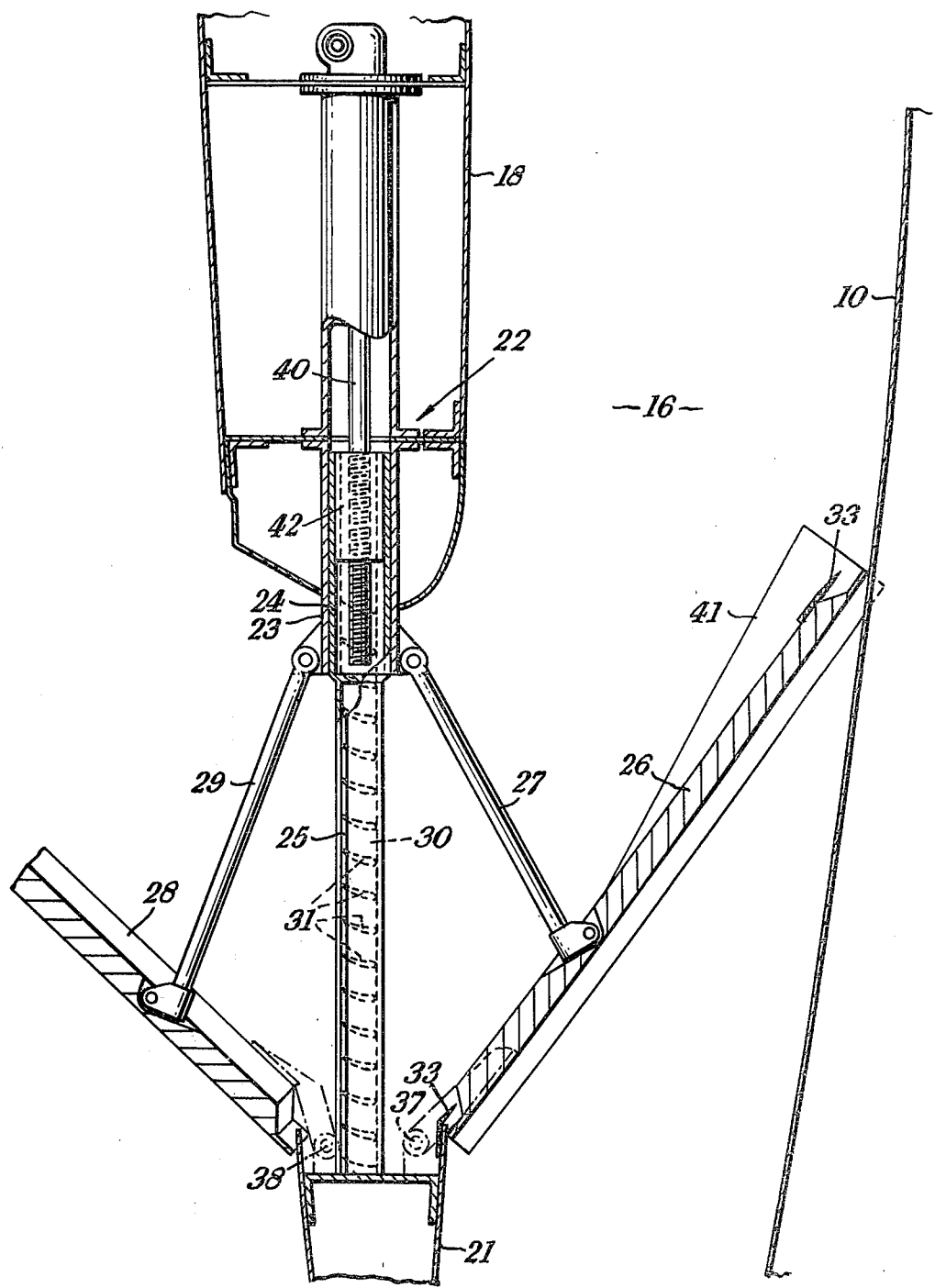

The following is a more detailed description of an embodiment of the invention, by way of example, reference being made to the accompanying drawings in which:

FIG. 1 is a side elevation of a by-pass gas turbine engine with unreversed thrust, FIG. 2 is a side elevation of the engine of FIG. 1 with reversed thrust, FIG. 3 is a section on the line III—III of FIG. 1, FIG. 4 is a view of a portion of FIG. 3 on a larger scale, FIG. 5 is a section on the line V—V of FIG. 4, FIG. 6 is a view on the line VI—VI of FIG. 5, FIG. 7 is a similar view to FIG. 5 but with the engine thrust reversed.

Referring first to FIG. 1, the gas turbine engine comprises an annular engine cowling 10 which encases a compressor stage 11, an ignition stage 12 and a turbine stage 13 and has a jet pipe 14 which forms an outlet for hot exhaust gases. An annular fan cowling 15 surrounds the engine cowling to form therewith a by-pass duct 16 for the passage of air from an engine-driven front fan 17 encased by the fan cowling 15 to an outlet at the downstream end of the by-pass duct to provide by-pass thrust.

The fan cowling 15 comprises an upstream portion 18 fixed to the engine cowling 10 by stator blades 19 and also fixed to an engine mounting 20 on a wing of an aircraft (not shown). The fan cowling 15 also comprises a downstream portion 21 separated from the upstream portion 18 by an annular space extending in the direction of the axis of the duct. As best seen in FIGS. 3, 5, 6 and 7, the upstream portion 18 and the downstream portion 21 are connected by six actuators 22, each of which has a body part 23 fixedly mounted on the upstream portion 18 and a driving rod 24 connected to the downstream portion 21 at an end thereof remote from the body part 23. Each actuator 22 includes a rotatable shaft 40 which so engages with the associated driving rod 24 through a nut 42 that rotation of the shaft 40 causes axial movement of the associated driving rod 24. The six actuators 22 extend in a direction parallel to but spaced from the axis of the duct and are spaced equiangularly around the duct. The actuators 22 are driven in synchronism so that the driving rods move together to move the downstream portion 21 in an axial direction between a further spaced position shown in FIGS. 1 and 5 and a closer spaced position as shown in FIGS. 2 and 7. Each driving rod 24 of each actuator 22 includes two flanges 25 (see FIG. 4) extending from opposite sides thereof. In addition, six guides (see FIG. 3) are mounted on the upstream portion 18 and extend axially from a downstream end of the upstream portion 18 into the space, the guides 36 alternating with the actuators 22 around the upstream portion 18 for a purpose described below.

As best seen in FIGS. 3 and 4, twelve thrust reversal doors 26 are connected at one end thereof by pivotal mountings 37 to an upstream end of the downstream portion 21. Their pivot axes are tangential to an imaginary circle lying in a plane normal to the axis of the duct and having a centre co-axial with the axis of the duct. Each thrust reversal door 26 is in the shape of a segment defined by a plane cutting a hollow right cylindrical body to give the segment part-circular ends of differing arc lengths, the diameter or the body being equal or substantially equal to the internal diameter of the duct. A triangular flap 41 is hinged along each axially extending edge of each thrust reversal door 26 so that when the flaps 41 of each door lie in the plane of the associated door a composite door is formed which is substantially rectangular in plan. Each flap 41 is urged by spring means (not shown) towards a position which it extends normal to the general plane of the associated thrust reversal door 25. However, each flap 41 is, in the position of the thrust reversal doors shown in FIG. 5, forced by contact with the downstream end of the upstream portion into a position which it is co-planar with its associated door. Thus, in this position, the thrust reversal doors 26 and the flaps 41 provide a substantially continuous annular closure for the annular space.

Referring next to FIGS. 4 and 5, twelve links 27 are provided which are, at one end, pivotally connected alternately to the casing 23 of an associated one of the actuators 22 and to a mounting on a corresponding end of the guides 36. The other end of each link 27 is pivotally connected to a corresponding one of the twelve thrust reversal doors 26 at a point on the door intermediate axially spaced ends of the door. The pivotal axes of each link 27 are parallel to the pivotal axis of the associated thrust reversal door 26.

Twelve diverter doors 28 (see FIGS. 1, 2, 3, 5 and 7) are connected at one end thereof by pivotal mountings 38 to the upstream edge of the downstream portion 21 and, in the position shown in FIGS. 1 and 5, are parallel to, but spaced outwardly in a direction normal to the axis of the duct from, the thrust reversal doors 26. The pivotal connections of the diverter doors to the downstream portion are about axes which are tangential to an imaginary circle lying in a plane normal to the axis of the duct and having a centre co-axial with the axis of the duct. Each diverter door 28 is the shape of a segment defined by a plane cutting a hollow right cylindrical body to give the segment part circular ends of equal arc lengths, the diameter of the body being equal or substantially equal to an external diameter of the duct and whose length is equal or substantially equal to the spacing in an axial direction of the upstream portion 18 and the downstream portion 21 in their further spaced position.

Twelve further links 29 are provided which are, at one end, pivotally connected alternately to the casing 23 of a corresponding one of the actuators 22 and to a mounting on an associated one of the guides 36. The other end of each link is pivotally connected to an associated one of the twelve diverter doors 28 at a point intermediate axially spaced ends of the diverter door 28. The pivotal axes of each further link 29 are parallel to the pivotal axis of the associated diverter door 28.

Referring next to FIGS. 3, 4 and 6, thirteen cascades 30 are connected to the downstream portion 21 and extend between the space between the thrust reversal doors 26 and the diverter doors 28. As shown in FIG. 6, axially extending edges of the cascades 30 bear alternately on the flanges 25 of the driving rods 24 and on the guides 36 with the exception of the cascades abutting the mounting 20 which have edges engaging in associated tracks 39 provided on the engine mounting 20. As best seen in FIG. 6, each cascade comprises a plurality of arcuate vanes 31 spaced apart by axially extending vanes 32.

The thrust reversal doors 26 are provided with flexible seals 33 which seal the gaps between the downstream ends of the thrust reversal doors 26 and the downstream portion 21 and the upstream ends of the thrust reversal doors 26 and the upstream portion 18, when the thrust reversal doors 26 are in the position shown in FIG. 5.

When the gas turbine engine is providing normal forward thrust, the engine configuration is as shown in FIG. 1, FIG. 3 in full line, FIG. 4 in full line, FIG. 5 and FIG. 6. In this configuration, the upstream and downstream portions 18, 21 are in their further spaced position and the length of the links 27 and the further links 29 is such that the thrust reversal doors 26 and the diverter doors 28 are held by the links 27 and the further links 29 in the position shown in FIG. 5 in which they together with the flaps 41 close the axial space between the upstream and downstream portions 18, 21 and in which the flow of air from the front fan 17 through the by-pass duct is uninterrupted by the thrust reversal doors 26. In this position the flaps 41 are held in position against the bias of the spring means by contact with the upstream end of the downstream portion 18.

To reverse the thrust of the by-pass air, the actuators 22 are operated by a control system 35 (FIGS. 1 and 2) and the synchronized movement of the driving rods 24 by the shafts 40 moves the downstream portion 21 towards the upstream portion 18 to the closer spaced position in FIGS. 2 and 7. As a result of this movement, the links 27 and the further links 29 cause the thrust reversal doors 26 and the diverter doors 28 respectively to pivot about their pivotal connections to the downstream portion until at the closer spaced position the diverter doors 28 and the thrust reversal doors 26 are in the positions shown in FIG. 2, in broken line in FIGS. 3 and 4 and in FIG. 7. In this thrust reversal position, the thrust reversal doors 26 are held by the links 27 in a position in which their free ends abut the engine cowling 10 to close or substantially close the duct and to prevent or substantially prevent the passage of air therethrough downstream of the doors. Due to their shape, the doors form a substantially solid wall between the downstream portion 21 and the engine cowling 10. In this position the flaps 41 extend normal to and forwardly of their associated thrust reversal doors 26 (see FIG. 6).

In addition, the diverter doors 28 are held by the further links 29 in a position in which they extend outwardly and forwardly from the downstream portion 21 to open the space between the upstream and downstream portions 18, 21 so that the by-pass air is diverted by the thrust reversal doors 26 and the diverter doors 28 through the space between the upstream and downstream portions and then forwardly towards the upstream end of the duct. The arcuate vanes 31 turn the air during thrust reversal and the axially extending vanes 32 ensure that the thrust reversal air is not directed towards the ground to raise dust which might be ingested into the engine. Thus the thrust of the engine fan air is reversed.

In this position sufficient power continues to be applied to the shafts 40 by the control system 35 to provide sufficient residual torque to prevent the nuts 42 travelling back along the shafts 40 as a result of the force applied thereto by the action of the air on the vanes 31. If, however, the drive to the actuators 22 fails this torque will no longer be applied and the nuts 42 will travel back along the shafts 40 to close the thrust reversal doors 26 and the diverter doors 28 and halt the reversal of thrust. This is an important safety feature because, in the event of a failure, it is generally desirable to have the engine providing forward thrust since control can be difficult if the engine cannot be moved from a reversal thrust condition.

Reversal of the actuators 22 will cause return movement of the nuts 42 and return of the downstream portion 21 to the further spaced position. The thrust reversal doors 26 and the diverter doors 28 will close to the position shown in FIG. 5 and the flaps 41 will be hinged by contact with the downstream end of the upstream portion until they are coplanar with their associated thrust reversal doors 26.

It will be appreciated that the diverter doors 28 are not essential for thrust reversal and may be omitted.

It will also be appreciated that the links 27 and the further links 29 need not be connected to the actuators 22 and may be connected directly to the upstream portion 18 or to any other point fixed relatively to the upstream portion 18. The actuators 22 may be of any convenient type such as actuators comprising shafts 40 which engages with the associated driving rod 24 through rotatable screw threads and co-operating nuts or re-circulating balls.

In addition, although the embodiment of the invention described above with reference to the drawings is incorporated in the fan cowling of a by-pass gas turbine engine, it will be appreciated that the invention may be embodied in the jet pipe 14 for the hot exhaust gases from the combustion and turbine stages 12, 13 of the engine with the jet pipes 14 being divided into spaced upstream and downstream portions and thrust reversal doors and diverter doors being arranged and operated in the manner described above with reference to the drawings. If a centre body 34 is provided in the jet pipe, as shown in the drawings, the thrust reversal doors will be of a similar shape to those shown in the drawings. However, where no centre body is provided, each thrust reversal door will be the shape of a segment defined by a plane cutting a hollow right cylindrical body to give the segment one part-circular end and one pointed end. The diameter of the body being equal to the internal diameter of the jet pipe.

What we claim is:

1. A gas turbine engine comprising a duct for the passage of a thrust producing gas, the duct having an upstream portion and a downstream portion spaced apart in a direction parallel to the axis of the duct, the downstream portion being movable relatively to the upstream portion in the said axial direction between a closer spaced position and a further spaced position, a plurality of thrust reversal doors pivotally connected to an upstream end of the downstream portion and extending therefrom towards the upstream portion, and a linkage assembly having a one end fixed relatively to the upstream portion and acting on each thrust reversal door at a point on the door spaced axially from the pivotal connection of the door to the downstream portion, the linkage assembly during movement of the downstream portion to the closer spaced position causing the thrust reversal doors to pivot to open the space between the upstream and downstream portions and to close or substantially close the duct for the reversal of thrust when the downstream portion reaches said closer spaced position and during movement of the downstream portion to the further spaced position, causing return pivoting of the thrust reversal doors to close or substantially close the space between the upstream and downstream portions and to leave the duct unobstructed or substantially unobstructed by the doors when the downstream portion reaches said further spaced position.

2. An engine according to claim 1 wherein the thrust reversal doors pivot about axes which are tangential to an imaginary circle lying in a plane normal to the axis of the duct and having a centre co-axial with the axis of the duct.

3. An engine according to claim 1 wherein the linkage assembly comprises a plurality of individual links, one link for each thrust reversal door, each link being pivotally connected at one end to the upstream portion and pivotally connected at the other end to the associated thrust reversal door, said pivotal connections being about axes which are parallel to the axis of the pivotal connection of the associated thrust reversal door to the downstream portion.

4. An engine according to claim 2 wherein each thrust reversal door is the shape defined by a plane cutting a hollow right cylindrical body to give the segment part-circular ends of different arc lengths, the diameter of the body being equal or substantially equal to the internal diameter of the duct and wherein a flap is hinged along each axially extending edge of each thrust reversal door, the flaps of each thrust reversal door being so shaped as to form therewith a composite thrust reversal door which is the shape of the segment of a cylindrical surface when the flaps are co-planar with the associated thrust reversal door, each flap being urged towards a position in which said flap extends normal to the associated thrust reversal door but, in the further spaced position of the upstream and downstream portions, being constrained to be co-planar with the associated thrust reversal door to close or substantially close said space.

5. An engine according to claim 1 and further comprising a plurality of diverter doors pivotally connected to the upstream end of the downstream portion, spaced outwardly in a direction normal to the axis of the duct from the thrust reversal doors and extending from the downstream portion towards the upstream portion, the linkage assembly acting on each diverter door at a point spaced axially from the pivotal connection of the diverter doors to the downstream portion, movement of the downstream portion towards the upstream portion causing pivoting of the diverter doors by the linkage assembly to open the diverter doors and leave the space between the upstream and downstream portions unobstructed or substantially unobstructed at said closer spaced position, and return movement of the downstream portion to said further spaced position causing return pivoting of the diverter doors by the linkage assembly to close or substantially close the space between the upstream and downstream portions at said further spaced position.

6. An engine according to claim 5 wherein the pivotal connections of the diverter doors to the downstream portion are about axes which are tangential to an imaginary circle lying in a plane normal to the axis of the duct and having a centre co-axial with the axis of the duct.

7. An engine according to claim 5 wherein the linkage assembly comprises a plurality of further links, one further link for each diverter door, each further link being pivotally connected at one end to the upstream portion and pivotally connected at the other end to the associated diverter door, the pivotal connections being about axes parallel to the axis of the pivotal connection of the associated diverter door to the upstream portion.

8. An engine according to claim 5 wherein each diverter door is the shape of a segment defined by a plane cutting a hollow right cylindrical body to give the segment part-circular ends of equal arc length, the diameter of the body being equal or substantially equal to the external diameter of the duct and whose length is equal or substantially equal to the spacing in an axial direction of the upstream and downstream portions in said further spaced position of the upstream and downstream portions.

9. An engine according to claim 3 wherein there are as many diverter doors as thrust reversal doors, the links and the further links being arranged in pairs with the link and the further link of each pair adjacent.

10. An engine according to claim 1 wherein a plurality of actuators are provided, each actuator having two relatively movable parts, one part being connected to the upstream portion and the other part being connected to the downstream portion whereby operation of the acuators moves the downstream portion between said closer spaced position and said further spaced position.

11. An engine according to claim 10 wherein a control system is provided which operates the actuators, wherein said one part comprises a threaded shaft and said other part comprises a member in such screw-threaded engagement with the shaft that, in use with thrust reversal, the axial force on the downstream portion provided by the reversed air causes the member to screw along the shaft to allow the upstream and downstream portions to move to said spaced position if the control system fails to apply a sufficient residual torque to the shaft to prevent such screwing movement.

12. An engine according to claim 1 wherein a vane assembly is provided in the space between the upstream and downstream portions, the vane assembly, in the closer spaced position of the upstream and downstream portions, changing the direction of thrust producing gas passing through the space so that the gas tends to travel in a direction towards an upstream end of the duct upon leaving the vane assembly.

13. An engine according to claim 12 wherein the vane assembly is connected to the downstream portion for movement therewith relatively to the upstream portion.

14. An engine according to claim 1 wherein a centre body is provided within the duct to define with the duct an annular passage, the thrust reversal doors in the closer spaced position of the upstream and downstream portions contacting the centre body for preventing or substantially preventing thrust producing gas passing through the passage.

15. An engine according to claim 14 wherein the duct comprises a by-pass fan cowling and the centre body comprises an exterior surface of an engine cowling.

16. An engine according to claim 1 wherein the duct comprises a jet pipe of the engine.

* * * * *